United States Patent [19]
Reid

[11] Patent Number: 5,865,996
[45] Date of Patent: Feb. 2, 1999

[54] WATER PURIFIER WITH COLLET AND TUBE SUPPORT

[76] Inventor: Roger P. Reid, P.O. Box 1359, Caldwell, Id. 83606

[21] Appl. No.: 689,883

[22] Filed: Aug. 14, 1996

[51] Int. Cl.[6] .................................................. B01D 35/02
[52] U.S. Cl. ....................... 210/232; 210/460; 210/463; 285/8; 285/10; 285/18; 285/31; 285/104; 285/113; 285/322; 285/323
[58] Field of Search .................................. 210/232, 460, 210/461, 463; 285/8, 10, 11, 18, 31, 32, 95, 104, 108, 109, 113, 322, 323

[56] References Cited

U.S. PATENT DOCUMENTS

| | | | |
|---|---|---|---|
| 3,732,985 | 5/1973 | Murrell | 210/446 |
| 4,178,023 | 12/1979 | Guest | 285/323 |
| 4,229,025 | 10/1980 | Volgstadt et al. | 285/105 |
| 4,282,175 | 8/1981 | Volgstadt et al. | 264/248 |
| 4,407,526 | 10/1983 | Cicenas | 285/242 |
| 4,628,965 | 12/1986 | Passerell | 138/89 |
| 4,645,245 | 2/1987 | Cunningham | 285/321 |
| 4,712,813 | 12/1987 | Passerell et al. | 285/250 |
| 4,770,768 | 9/1988 | Lang | 210/232 |
| 5,230,539 | 7/1993 | Olson | 285/323 |
| 5,468,028 | 11/1995 | Olson | 285/322 |
| 5,591,332 | 1/1997 | Reid et al. | 210/235 |
| 5,635,058 | 6/1997 | Bowman | 210/232 |

OTHER PUBLICATIONS

Brass Fittings and Valves Catalog 3501–E, Parker Fluid Connectors, Parker Hannifin Corporation, Brass Products Division, 300 Parker Drive, Otsego, Michigan 49078, p. 67, Feb. 1984.

*Primary Examiner*—W. L. Walker
*Attorney, Agent, or Firm*—Ken J. Pedersen; Barbara S. Pedersen

[57] ABSTRACT

A water purifier includes a port having a collet, an O-ring seal, and a support between the collet and the seal. The collet axially receives a tube for water passage. The support limits radial movement of the tube off the axis. The support has an L-shaped cross section having a radial leg that seats the O-ring, and an axial leg. Water purifiers are often installed in confined spaces near mechanical equipment. Conventional water purifiers installed with sharp bends in influent and effluent water tubes and exposed to equipment vibration conducted by the tubes often exhibit weeping at the port. In an embodiment of the present invention, weeping is eliminated by maintaining axial relation between the tube, the seal, and the collet.

20 Claims, 2 Drawing Sheets

WATER PURIFIER WITH COLLET AND TUBE SUPPORT

DESCRIPTION

1. Field of the Invention

Embodiments of the present invention relate to water purification and to watertight connections in water purification systems.

2. Background of the Invention

As an introduction to problems solved by the present invention, consider the conventional water purifier as installed in a confined space near mechanical equipment. Such a water purifier when necessarily installed with sharp bends in influent and effluent water tubes and when exposed to equipment vibration conducted by the tubes often weeps at an influent or effluent port. Intermittent weeping is difficult to detect, diagnose, and repair. Replacement of the water purifier is expensive in direct costs as well as costs related to interruption of purification services. The fluid passageway responsible for weeping is an open conduit for infectious contamination of the water systems connected to the water purifier. Because weeping is often intermittent for an extended period of time before it is detected, serious contamination may result in significant health hazards brought on unexpectedly in conjunction with a device purported to purify water. The worldwide market for water purifiers is consequently affected by the lack of watertight ports on conventional water purifiers.

In view of the problems described above and related problems that consequently become apparent to those skilled in the applicable arts, the need remains in water purification for watertight connections in water purification systems.

SUMMARY OF THE INVENTION

Accordingly, a water purifier in one embodiment of the present invention includes a port having an opening and an axis through the opening. The port includes a collet, a seal, and a support. The collet, positioned within the opening and on the axis, receives a tube for water passage. The tube is sealed to the opening by the seal. The support, in mechanical communication with the tube and in series between the collet and the seal, limits movement of the tube in a direction off the axis.

A water purifier according to another embodiment has an axis on which the purifier receives a tube. The tube is used for conducting water either into or away from the purifier. The purifier includes a first system for water purification and a second system for sealing the first system to the tube. The second system includes a collet around the tube, a collet retainer around the collet, a support retainer joined to the collet retainer, a seal, and a support. The support retainer has a coaxially stepped bore. The bore has a first step and a second step at a larger diameter than the diameter of the first step. The first step provides a sealing surface. The second step provides a supporting surface. The seal, for example an O-ring, seals the tube to the sealing surface. The seal is retained on the sealing surface because the support, in one embodiment, abuts the first step. The support resists a radial moment in the tube by coupling the moment to the support retainer.

According to a first aspect of these embodiments, the support limits radial movement of the tube in a region near the seal. By limiting radial movement, a watertight seal is maintained within a range of motion allowed by the seal.

According to a second aspect, the support is manufactured of a rigid, nonhygroscopic material so that its dimensions hold to a higher tolerance and thereby compensate for manufacturing, installation, and aging effects on dimensions and materials critical to sealing in such water purifiers. Higher reliability and longer life result, with consequent increased market penetration and expanded uses.

These and other embodiments, aspects, advantages, and features of the present invention will be set forth in part in the description which follows, and in part will become apparent to those skilled in the art by reference to the following description of the invention and referenced drawings or by practice of the invention. The aspects, advantages, and features of the invention are realized and attained by means of the instrumentalities, procedures, and combinations particularly pointed out in the appended claims.

Those of ordinary skill in the art will recognize where portions of a figure have been expanded to clarify the presentation.

DESCRIPTION OF THE PREFERRED EMBODIMENTS

Figure 1:
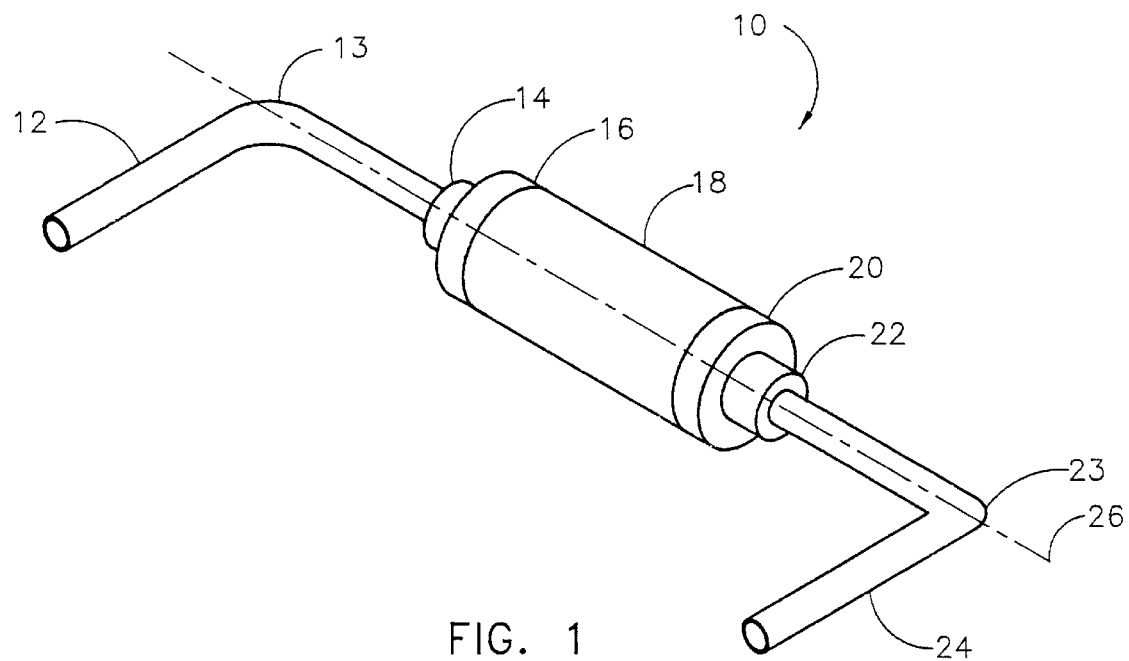
FIG. 1 is a perspective view of a water purifier in one embodiment of the present invention.

FIG. 1 is a perspective view of a water purifier in one embodiment of the present invention. Water purifier 10 includes ports 14 and 22 on axis 26 which passes through cap 16, body 18, and cap 20. Ports 14 and 22 include watertight seals to be described below which permit installation with sharp bends near the ports and permit installation without regard to vibration of tubes 12 and 24 or the orientation of the gravitational force on the body.

In the installation shown, tube 12 includes a sharp bend 13 and tube 24 includes a sharp bend 23 prior to entry into ports 14 and 22 respectively. Such sharp bends create a moment, i.e. a nonaxial force. When body 18 is not supported, gravity presents an additional moment at ports 14 and 22. These comparatively steady state moments are modulated by vibration conducted in tubes 12 or 24, or both. The ports of the present invention compensate for the sum of these moments.

Figure 2:
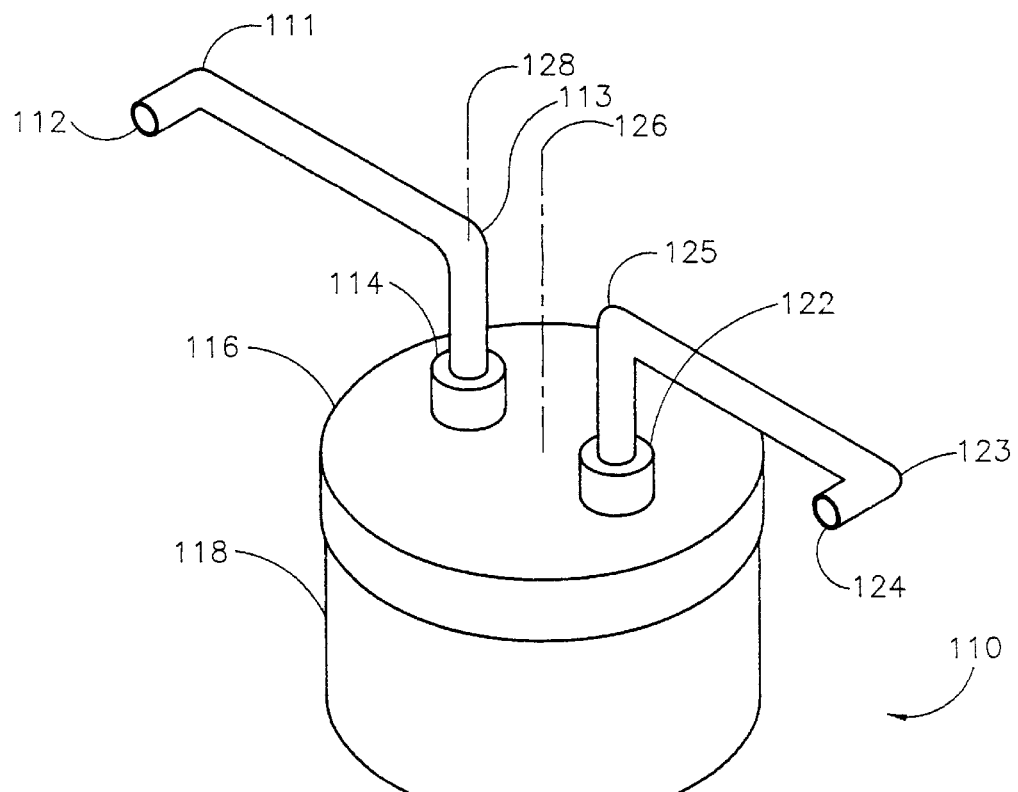
FIG. 2 is a perspective view of another water purifier in another embodiment of the present invention.

FIG. 2 is a perspective view of another water purifier in another embodiment of the present invention. Water purifier 110 includes ports 114 and 122, cap 116, and body 118. Connection of tube 112 to port 114 could not be made in the confined space available without sharp bends 111 and 113. Likewise connection of tube 124 to port 122 could not be made in the installation illustrated without sharp bends 123 and 125. Water purifier 110 is exposed to moments similar to those described with reference to FIG. 1. In addition, moments about body axis 126 will have component moments, for example, about axis 128 through port 114. Due to the non-coplanar bends 111, 113, 125, and 123 and asymmetric center of mass of body 118, moments at port 114 include mechanical harmonics and resonances at unexpectedly high amplitudes.

To prevent weeping, fatigue, wear, and possible catastrophic failure of the seals at ports 14, 22, 114, and 122, embodiments of the present invention include watertight seals at these ports. Each body 18 and 118 includes means for water purification including such known devices and combinations as water treatment apparatus, filters, resins, mineral and biological treatment reagents, mixing baffles, membranes, screens, valves, other fluid control mechanisms, and replaceable cartridges. In an in-line water purifier application, line pressure exists throughout water purifier 20 and 110. In addition, fluid purification presents nonuniform fluid resistance which in combination with sudden changes in line pressure gives rise to pressures at ports 14, 22, 114, and 122 that exceed line pressure. The intermittent nature of line pressure changes makes diagnosing problem seals difficult and makes watertight seals economically important. Watertight seals of the present invention are described below with reference to FIG. 3.

Figure 3:
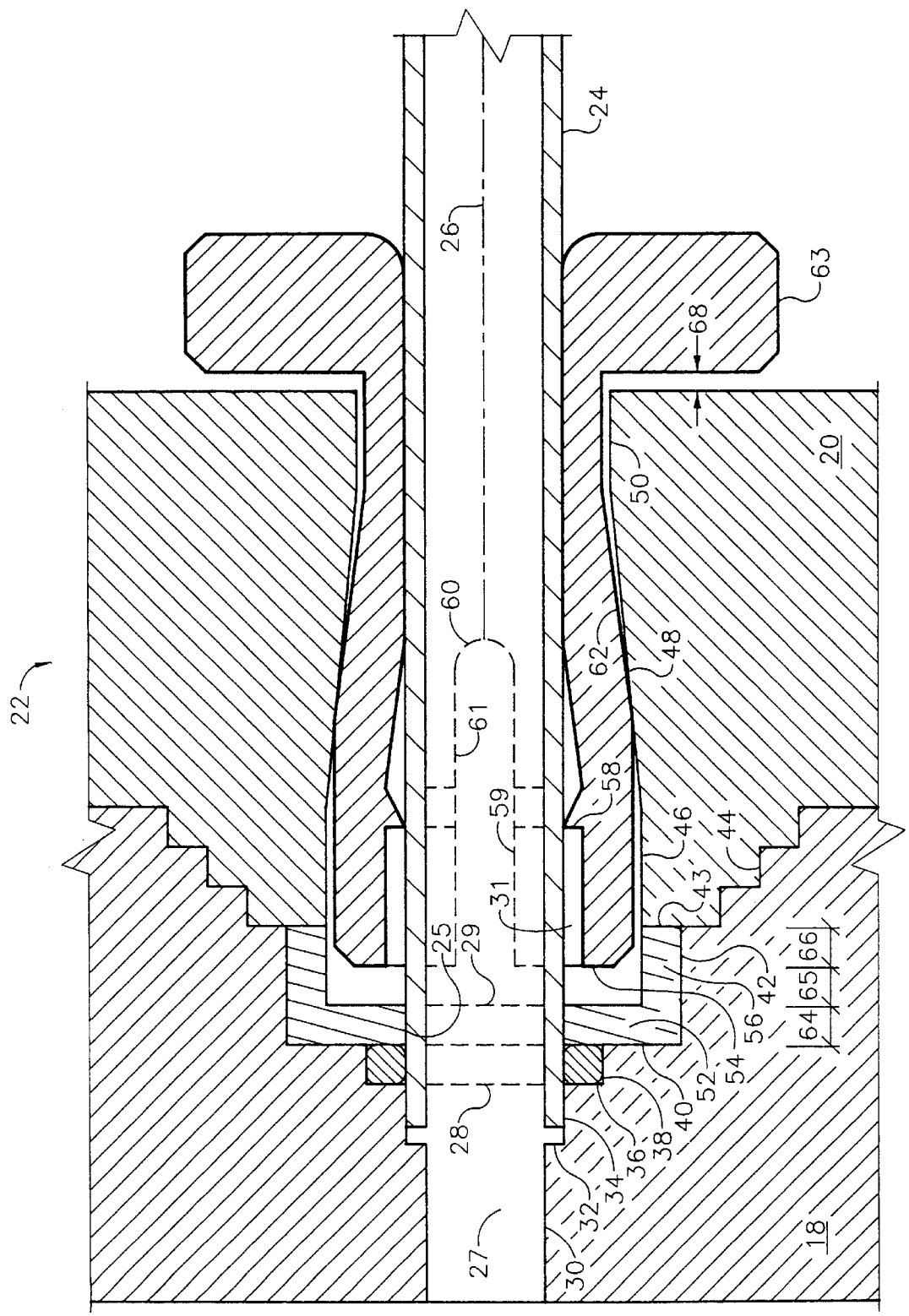
FIG. 3 is a cross section of a port of the water purifier of FIG. 1.

FIG. 3 is a cross section of a port of the water purifier of FIG. 1. Port 22, as illustrated, is exemplary and identical in all relevant respects to ports 14, 114, and 122. Port 22 includes bore 27 in body 18, O-ring 28, support ring 29, bore 31 in cap 20, and collet 63. To assemble, O-ring 28 is placed in body 18, followed by support ring 29. Cap 20 is then conventionally joined to body 18 at stepped surface 44. Finally, collet 63 is snapped into bore 31. Tube 24 can then be inserted on axis 26 through collet 63, support ring 29, and O-ring 28 until tube 24 meets surface 32 in body 18. Water under pressure can then pass between tube 24 and passageway 30. Water pressure forces tube 24 away from surface 32; however, collet 63 is thereby forced against frustoconical surface 48 to retain the tube.

Bore 27 is a stepped bore in that it includes three steps. The first step provides a tube stop to position the end of tube 24 on entry to port 22. The first step includes radial surface 32 (normal, i.e. perpendicular, to axis 26) and axial surface 34 (parallel to axis 26). The axial length of axial surface 34 in alternate embodiments proceeds further into body 18 to provide additional leverage to oppose radial movement of tube 24.

The second step provides sealing surfaces for O-ring 28. The second step includes radial surface 36 and axial surface 38. In a first embodiment, O-ring 28, a conventional rubber O-ring, is sized to accept tube 24 on entry and collapse against surface 38 to form a watertight seal.

The third step provides support for support ring 29. The third step includes radial surface 40 that locates support ring 29 during assembly. Support ring 29 bears in part against axial surface 42 and in part against radial surface 40 to inhibit and limit radial movement of tube 24 within port 22. The length of leg 56 and surface 42, if increased, provides additional support for support ring 29 on axial surface 42. Support ring 29 is made of ABS plastic for rigidity, strength, and dimensional stability as well as fluid properties including nonhygroscopic properties that are compatible with water purification.

Radial movement of a tube through a conventional O-ring seal causes such a seal to separate from its sealing surface. Here, however, radial movement of tube 24 is limited so that O-ring 28 does not separate from sealing surface 38 or tube surface 25. Limiting is accomplished by contact between support ring 29 and surfaces 42, 43, and 40 and contact between support ring 29 and tube 24 at tube surface 25. In addition, radial movement of tube 24 off axis 26 is further limited, reduced, or eliminated by the cooperation of tube 24 against surface 34.

Collet 63 includes several fingers 59, 61 separated by gaps, one shown as gap 60. Each finger, for example finger 59, includes a tooth 58 that grips tube 24 on insertion into collet 63 and resists removal of tube 24. Removal is resisted by conventional cooperation of bore 31 in contact with collet 63. Particularly, bore 31 includes axial surface 46, frustoconical surface 48, and axial surface 50. Collet 63 further includes face 54, and tapered surface 62. As face 54 is urged axially toward support ring 29, tapered surface 62 moves in spring tension away from axis 26, disengaging tooth 58 of finger 59 and other teeth on respective fingers from tube 24 and thereby allowing removal of tube 24 from collet 63.

Support ring 29 includes a radial leg 52 and an axial leg 56, both dimensioned for support of tube 24 and for operation of collet 63. Specifically, thickness 64 of leg 52 is sized to support tube 24 without buckling under expected radial moments in tube 24. Distance 65 allows sufficient movement of collet 63 to release tooth 58. Distance 65 is greater than distance 68 so that O-ring 28 is not affected by movement of collet 63 whether during insertion of tube 24 through collet 63 or during removal of tube 24 from collet 63. Collet 63 extends into support ring 29 a distance 66. Further, as a consequence of the overlap between support ring 29 and collet 63, when collet 63 is subject to radial loading, collet 63 is aligned on tube 24, tooth 58 and other teeth on respective fingers are aligned in proper relation to tube 24, and tube 24 is thereby axially aligned in bores 31 and 27. The functions of support ring 29 are enhanced as one consequence of maintaining such alignment among collet, tube, and bores.

Tube 24 is of conventional copper construction and dimension. Alternate embodiments accept tubes of various metallic and plastic materials having various bend and strength criteria. Compatible alternative dimensions for steps and distances 64 through 68 are considered within ordinary design skills of those practicing the present invention.

In the embodiment illustrated in FIG. 3, bore 27, support ring 29, collet 63, and cap 20 cooperate as means for supporting tube 24 in body 18. Bore 27, support ring 29, and O-ring 28 cooperate as means for sealing tube 24 with body 18.

The foregoing description discusses preferred embodiments of the present invention, which may be changed or modified without departing from the scope of the present invention. For example, stepped surface 44 may be formed in any manner compatible with the method and equipment used to join the cap to the body. Body 18 and cap 20 are joined in alternate and equivalent embodiments by bonding, sonic welding, adhesive, screw thread, bayonet, or press fit, to name a few conventional techniques. Collets of alternate construction are used in alternate embodiments of the present invention. For example, a two piece collet having a separable ring of teeth is used in one embodiment.

Still further, support ring 29 in alternate and equivalent embodiments provides additional support with an axial leg that extends both toward the collet and away from the collet into a groove in the body. When distance 64 is made sufficient for supporting tube 24 in another alternate and equivalent embodiment, axial leg 56 is omitted.

The means for water purification is surrounded by a multi-part enclosure which includes cap 16, body 18, and cap 20 in FIG. 1 and equivalently includes cap 116 and body 118 in FIG. 2.

Caps 16 and 116 are examples of a collet retainer which in alternate embodiments is fashioned as a part of an enclosure other than a cap or is fashioned separately to be used in conjunction with any portion of an enclosure. In alternate and equivalent water purifiers, the collet retainer is fashioned as part of a cap, a body, a bulkhead, a partition, a side wall, an end wall, or a backing, such as a plate, a washer, or a sleeve.

Bodies 18 and 118 are examples of a support ring retainer which in alternate embodiments is fashioned as a part of an enclosure other than the body or is fashioned separately to be used in conjunction with any portion of an enclosure. In alternate and equivalent water purifiers, the support retainer is fashioned as part of a cap, a body, a bulkhead, a partition, a side wall, an end wall, or a backing, such as a plate, a washer, or a sleeve.

These and other changes and modifications are intended to be included within the scope of the present invention. While for the sake of clarity and ease of description, several specific embodiments of the invention have been described; the scope of the invention is intended to be measured by the claims as set forth below. The description is not intended to be exhaustive or to limit the invention to the form disclosed. Other embodiments of the invention will be apparent in light of the disclosure to, and in light of practice of the invention by one of ordinary skill in the art to which the invention applies.

Although this invention has been described above with reference to particular means, materials, and embodiments, it is to be understood that the invention is not limited to these disclosed particulars, but extends instead to all equivalents within the scope of the following claims.

What is claimed is:

1. A water purifier that receives a tube, the tube having an axis, the tube for conducting water, the purifier comprising:
   a. a means for water purification in fluid communication with the tube;
   b. a collet system for sealing the means for water purification to the tube, the collet system comprising:
      (1) a collet for surrounding the tube;
      (2) a collet retainer surrounding the collet;
      (3) a support retainer joined to the collet retainer, the support retainer comprising a coaxially stepped bore, the bore comprising a first step at a first diameter, a second step at a second diameter greater than the first diameter, the first step providing a sealing surface, and the second step providing a supporting surface;
      (4) an O-ring on the sealing surface, the O-ring for sealing the tube to the sealing surface; and
      (5) a support ring between the O-ring and the collet and in mechanical communication with the first step to retain the O-ring on the sealing surface, the support ring in further mechanical communication with the supporting surface and extending radially inward for contacting the tube to resist a radial moment in the tube by coupling the moment to the support retainer.

2. A water purifier that receives a tube, the tube having an axis, the tube for conducting water, the purifier comprising:
   a. a means for water purification in fluid communication with the tube;
   b. a collet system for sealing the means for water purification to the tube, the collet system comprising:
      (1) a collet for surrounding the tube;
      (2) a collet retainer surrounding the collet;
      (3) a support retainer joined to the collet retainer, the support retainer comprising a coaxially stepped bore, the bore comprising a first step at a first diameter, a second step at a second diameter greater than the first diameter, the first step providing a sealing surface, and the second step providing a supporting surface;
      (4) a seal on the sealing surface, the seal for sealing the tube to the sealing surface; and
      (5) a support in mechanical communication with the first step to retain the seal on the sealing surface, wherein the support is in further mechanical communication with the supporting surface to resist a radial moment in the tube by coupling the moment to the support retainer, and wherein the support is in further mechanical communication with the collet retainer wherein the support is retained on the second step by the collet retainer.

3. The purifier of claim 2 wherein the seal comprises an O-ring.

4. The purifier of claim 2 wherein the collet retainer comprises a frustoconical surface.

5. The purifier of claim 2 wherein the support retainer is joined to the collet retainer by press fit.

6. A water purifier that receives a tube, the tube having an axis, the tube for conducting water, the purifier comprising:
   a. a means for water purification in fluid communication with the tube;
   b. a collet system for sealing the means for water purification to the tube, the collet system comprising:
      (1) a collet for surrounding the tube;
      (2) a collet retainer surrounding the collet;
      (3) a support retainer joined to the collet retainer, the support retainer comprising a coaxially stepped bore, the bore comprising a first step at a first diameter, a second step at a second diameter greater than the first diameter, the first step providing a sealing surface, and the second step providing a supporting surface;
      (4) a seal on the sealing surface, the seal for sealing the tube to the sealing surface; and
      (5) a support in mechanical communication with the first step to retain the seal on the sealing surface, wherein the support is in further mechanical communication with the supporting surface to resist a radial moment in the tube by coupling the moment to the support retainer, and wherein the support comprises an L-shaped cross section having an axial leg aligned along the axis and a radial leg aligned normal to the axis.

7. The purifier of claim 6 wherein the axial leg is in contact with the supporting surface.

8. The purifier of claim 6 wherein the radial leg abuts the tube.

9. The purifier of claim 6 wherein the seal comprises an O-ring.

10. The purifier of claim 6 wherein the collet retainer comprises a frustoconical surface.

11. The purifier of claim 6 wherein the support retainer is joined to the collet retainer by press fit.

12. A water purifier that receives a tube, the tube having an axis, the tube for conducting water, the purifier comprising:
    a. a means for water purification in fluid communication with the tube;
    b. a collet system for sealing the means for purifying water to the tube, the collet system comprising:
       (1) a collet for surrounding the tube;
       (2) a collet retainer surrounding the collet;
       (3) a support retainer joined to the collet retainer, the support retainer comprising a coaxially stepped bore the bore comprising a first step at a first diameter, a second step at a second diameter greater than the first diameter, the first step providing a sealing surface, and the second step providing a supporting surface;
       (4) a seal on the sealing surface, the seal for sealing the tube to the sealing surface; and
       (5) a support in mechanical communication with the first step to retain the seal on the sealing surface, wherein the support is in further mechanical communication with the supporting surface to resist a radial moment in the tube by coupling the moment to the support retainer, and wherein the support retainer is welded to the collet retainer.

13. A water purifier that receives a tube the tube having an axis, the tube for conducting water, the purifier comprising:
   a. a means for water purification in fluid communication with the tube;
   b. a collet system for sealing the means for purifying water to the tube the collet system comprising:
      (1) a collet for surrounding the tube;
      (2) a collet retainer surrounding the collet;
      (3) a support retainer joined to the collet retainer, the support retainer comprising a coaxially stepped bore, the bore comprising a first step at a first diameter, a second step at a second diameter greater than the first diameter, the first step providing a sealing surface, and the second step providing a supporting surface;
      (4) a seal on the sealing surface, the seal for sealing the tube to the sealing surface; and
      (5) a support in mechanical communication with the first step to retain the seal on the sealing surface, wherein the support is in further mechanical communication with the supporting surface to resist a radial moment in the tube by coupling the moment to the support retainer, and wherein the support retainer is joined to the collet retainer by adhesive.

14. A water purifier comprising:
   a. means for purifying provided water;
   b. a tube for passage of water to the means for purifying water; and
   c. a port having an opening receiving the tube and an axis through the opening, the port comprising:
      (1) a collet within the opening and on the axis, the collet for receiving the tube for passage of the water;
      (2) a seal for fluid-sealing the tube to the opening; and
      (3) a support ring received in the opening of the port and contacting an outer surface of the tube and located in series between the collet and the seal, for limiting movement of the tube off the axis.

15. The water purifier of claim 14 wherein the support ring is in further mechanical communication with the collet for axially aligning the collet and thereby axially aligning the tube.

16. The water purifier of claim 14 wherein the port comprises a frustoconical surface around the opening for retaining the collet.

17. A water purifier comprising:
   a. means for purifying water; and
   b. a port having an opening and an axis through the opening, the port comprising:
      (1) a collet within the opening and on the axis, the collet for receiving a provided tube for passage of the water;
      (2) a seal for fluid-sealing the tube to the opening; and
      (3) a support in mechanical communication with the tube and in series between the collet and the seal for limiting movement of the tube off the axis wherein the port comprises a cap that retains the support between the seal and the collet.

18. The water purifier of claim 17 further comprising an enclosure that surrounds the means for purifying water, wherein the enclosure is joined to the cap.

19. The water purifier of claim 18 wherein the enclosure is joined to the cap by welding.

20. The water purifier of claim 18 wherein:
   a. the seal comprises an O-ring; and
   b. the enclosure comprises a bore having a first diameter that seals to the O-ring and a second diameter that holds the support between the cap and the enclosure.

* * * * *